July 2, 1940.
E. G. STEELE
2,206,337
METHOD OF DECOLORIZING LIQUIDS
Filed Feb. 10, 1938
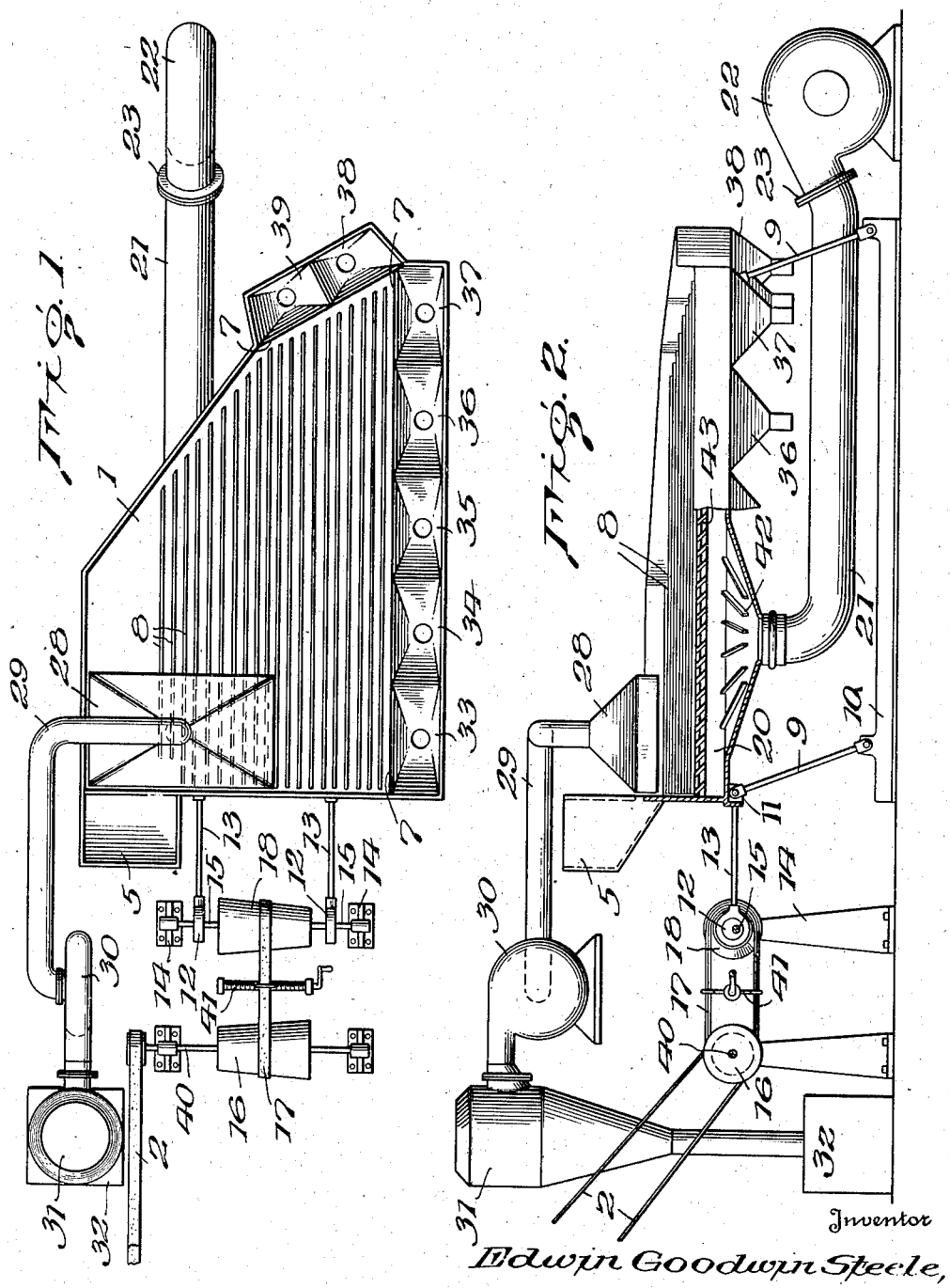
Inventor
Edwin Goodwin Steele,
By A. M. Houghton
his Attorney Patented July 2, 1940

2,206,337

UNITED STATES PATENT OFFICE 2,206,337

METHOD OF DECOLORIZING LIQUIDS

Edwin G. Steele, Dallas, Tex.; Bess Ryan Steele executrix of said Edwin G. Steele, deceased Application February 10, 1938, Serial No. 189,894

8 Claims. (Cl. 196—147)

This invention or discovery relates to purification of liquids; and it comprises a method of utilizing a mass of granular adsorbent material, such as fuller's earth, in a cyclic and economical manner, in decolorizing and like treatments of liquids, and especially oils, wherein such a mass of adsorbent material is contacted with a liquid containing coloring matter or other impurities which are taken up by the adsorbent, and the used adsorbent is then freed of residual liquid and revivified by heating to a temperature sufficiently high to burn out adsorbed organic matter but insufficient to effect substantial lessening of its adsorbent power, and wherein the mass of revivified adsorbent is classified into at least two portions, usually including a major portion having higher adsorbent power than the unseparated mass and a minor portion having lower adsorbent power than the unseparated mass, and wherein the said minor portion is withdrawn from the system and the major portion is combined with a further quantity of material having equal or higher adsorbent power to reconstitute the mass, which is then returned to the system for contact with a further quantity of liquid, whereby the adsorbent power of the granular material employed is maintained substantially uniform throughout repeated cycles of use; and it comprises classification of the used and revivified granular adsorbent by a treatment on a classifying table which is advantageously combined with removal of undesirably fine particles and dust; all as more fully hereinafter set forth and claimed.
Granular adsorbent materials, and especially fuller's earth and like adsorbents of a mineral nature, are widely used for decolorizing and like treatments of various liquids. Oils, and especially mineral oils and derivatives or fractions thereof, sometimes designated petroleum products, are treated with such adsorbents on a very large scale. The treatment is frequently effected by percolating the oil, etc., through a suitable bed or mass of the granular adsorbent material.
Sometimes the adsorbent is stirred into the liquid and then separated out, as by filtration, after sufficient contact. In that case, the particles or grains of adsorbent employed are generally finer than when the percolation method is followed.
Even with the percolation method, however, the size of the grains or granules of adsorbent may vary considerably; from a size which will not pass through a screen having 60 meshes per inch to a size which will just pass through a screen having 15 meshes per inch, for example. A grain size frequently used for decolorizing oil contains granules ranging in size from 15 to 30 mesh. My invention is not limited to the use of particles or granules of this particular size, however.

After the oil or other liquid has been decolorized or otherwise purified by contact with granular fuller's earth, for example, the adsorbent is usually washed with an appropriate solvent to eliminate the remaining liquid. The solvent is then withdrawn, and the material is fitted for re-use as a decolorizing agent, by revivification. This includes re-burning in a suitable kiln or furnace, at a temperature high enough to burn out residual organic matter. Suitable apparatus for revivifying includes Wedge furnaces, vertical tumbling kilns, and revolving cylindrical kilns mounted at a slight angle to the horizontal. The earthy decolorizing agents are generally revivified in an oxidizing atmosphere.

The decolorizing agents employed in the processes of this nature are ordinarily re-burned and re-used many times. For example, fuller's earth may be used anywhere up to 10 to 50 times for decolorizing various mineral oils, if it is suitably revivified after each use. This repeated use and revivification gradually reduces the adsorbent or decolorizing value. This reduction occurs more rapidly with fuller's earth than with bonechar, for example, but in masses of either material different granules degrade at different rates. It appears that through repeated use and revivification, the pores of the material become closed or filled up, and I have found that the density of a material such as fuller's earth is indicative of its decolorizing value. I believe that this may be explained as follows.

Fuller's earth is a commercial name for any clay of sufficient adsorptive power to render its use worth while in refining oils, including mineral oil as well as vegetable and animal oils. In refining, the function of the clay is to adsorb coloring matter or some other non-oily constituent of the oil, and to collect dispersed solids and liquids of colloidal fineness. In the case of mineral oils, a marketable product may be clayed several times during the routine of production. The technical value of any clay or fuller's earth is proportional to its surface, interior and exterior. Other things being equal, the amount of coloring matter, etc., which can be taken up or adsorbed by a pound of fuller's earth is proportional to the surface it offers to the oil. Most of this surface is internal. In burning the clay for revivification after use, it is desirable to heat to a temperature just below the sintering point of the clay, to eliminate organic matter and carbon as completely as possible. However, in practice the temperature can seldom be controlled with sufficient accuracy to prevent a certain amount of sintering; shrinkage of some of the clay during this re-burning seems to be inevitable. This shrinkage is at the expense of internal porosity; and internal voids, some of which are probably of almost molecular dimensions, are obliterated.

Any quantity of re-burned fuller's earth normally contains a large portion of granules or particles which still retain substantially their original effectiveness, and also contains a minor proportion of granules shrunk sufficiently to reduce their decolorizing action to a point where it is not useful. Each re-burning of the mass adds to the quantity of shrunken granules which, of course, have higher density than the effective material. As a result, the total adsorbent power of the mass continually becomes more and more degraded with use.

In the past, it has frequently been the practice, in decolorizing oil and similar processes, to re-burn and re-use a batch of granular fuller's earth, for example, until its decolorizing value has depreciated to a certain extent, and then to discard the entire batch. This method of operation was obviously highly uneconomical, but heretofore there was no known alternative. It was uneconomical because the progressive degradation of the adsorbent, previously noted, was frequently continued until more than two-thirds of the entire batch was inert and useless before the batch was discarded. One result of this has been that decolorizing material was frequently in use in which only one-third of the total mass was material having any substantial decolorizing value. However, even if the mass was discarded at this stage of degradation, the user was discarding a ton of useful decolorizing agent with each two tons of useless material.

Because of this, it has frequently been the practice to store quantities of decolorizing agent in various degrees of degradation, and to employ the poorest available material which would satisfy the requirement of a particular treatment. With this practice, when a high degree of decolorization was required, it was sometimes necessary to delay a batch of liquid until a sufficiently good batch of decolorizing agent was available. On the other hand, if a high degree of decolorization was not necessary, economy often required that the oil, for example, be delayed until there was available a batch of decolorizing agent which was the poorest which would suffice for the particular job. In addition to the inconvenience of this method of operation, it has entailed high investment cost in decolorizing agent and in buildings, bins and tanks for holding and using a large number of separate batches of material, and a correspondingly high operating cost.

I have found that the difficulties and undesirable necessities of past methods of operating oil decolorizing and similar processes can be overcome if the adsorbent is subjected, after use and revivification, to a grading or separation which eliminates that portion of the material having no useful decolorizing value. This classification can be controlled to eliminate material having less than any predetermined decolorizing value, or to separate the revivified material into classes having decolorizing values graded, in any preselected number of steps, from substantially no value to substantially the value of fresh material.

I have further found that the separation or grading or classification required for this stage of my process is most effectively accomplished by the use of a classifying table similar to the type of table used heretofore for the classification of other materials. Such a table and its operation are described in detail in my copending application, Serial No. 753,197, filed November 15, 1934.

One of the objects achieved by my present invention is to provide, as a step in a liquid treating operation, a method of continuously removing from a quantity of used granular decolorizing material, all that portion of the material which has no decolorizing value, or which has less than a designated decolorizing value. Another object achieved by my invention is the provision of a process of decolorizing mineral oil and the like, during oil refining operations, for example, in which fuller's earth or a similar granular earthy decolorizing material is employed to decolorize the oil, is freed from residual oil and revivified, and is then separated into at least two portions, one of which has better decolorizing value than the unseparated material. Simultaneously, if desired, portions may be separated having intermediate decolorizing value and good "sweetening" value, as that term is used in oil refining.

An advantage of my process is that it may readily be operated in such a manner as to remove from the revivified material any powdered or undersized material, regardless of decolorizing value. The filtering capacity or flow rate of the remaining material is thereby maintained at a higher level. Other objects and advantages of my invention will be apparent from the following description and the appended claims.

As previously indicated, the decolorizing value of granular adsorbents, and particularly of fuller's earth and like earthy decolorizing agents which have been used and revivified, is quite directly related to the density of the material. However, due to the physical nature of this material it is not convenient or economical to separate it into fractions of varying decolorizing value by air flotation and similar air separation methods, in which it is attempted to suspend the whole mass of material in air. Such processes find utility in the removal of fines, dust and decomposed portions of the granular material, but are not commercially practicable for the classification of material of the desired size in accordance with decolorizing value.

I have found, however, that the desired classification may be obtained by the use of a suitable classifying table. Such a table preferably has a top or deck which is permeable to air, but not to the granules being processed thereon, and this deck is advantageously provided with a plurality of parallel riffles extending from one end of the table to a point somewhat short of the opposite end of the table. In operation, this table is reciprocated endwise, advantageously with a simultaneous upward thrust or arcuate motion, which is sometimes called a "grasshopper" motion. This motion of the table effects classification of the granules most effectively when air is simultaneously passed upwardly through the deck. The granular decolorizing material to be classified is supplied in a stream to one corner of the table, and any desired number of separated portions or classes are discharged from a zone extending along the opposite side or opposite end of the table.

The revivified fuller's earth generally contains a certain small amount of undesirably fine material or dust which, if allowed to remain with the granular material, tends to choke up the voids in the filter and to materially increase the time required for percolation of the oil or other liquid therethrough. This material is readily removed simultaneously with my classification treatment, if desired. To effect this result, the air passing upwardly through the table is controlled by baffles, for example, so that the strongest air blast passes through the material where it is first fed onto the table. This strong blast of air serves the purpose of lifting undesirably fine material out of the mass of larger granules, and it may then be carried off through a suitable hood connected by a duct to the intake of an exhaust fan or blower, for example. If desired, this fine material may be recovered in a cyclone separator or the like, and may be thereafter employed or disposed of, as desired.

One form of apparatus suitable for effecting the separating or classifying step of my process is shown in the accompanying drawing, in which Fig. 1 is a plan view of a suitable separating or classifying table with associated mechanism, and Fig. 2 is an elevational view, with parts broken away, of the same apparatus.

In the drawing, the deck of the table is indicated at 1. A stream of dry particles of an adsorbent, such as revivified granular fuller's earth, is fed onto the deck of the table at a rear corner from a feed hopper 5. When the table is reciprocated the granules travel across the deck, and individual particles take different paths in accordance with their decolorizing power and density. The streams of particles so separated, discharge over an edge 7 of the deck into a plurality of receivers such as funnels 33, 34, 35, 36, 37, 38 and 39.

The deck I advantageously has a slight downward tilt transversely, from the point of feed at the rear to the front or discharge edge 7, and has a slight upward tilt longitudinally from the feed end to the opposite end. The table is supported on pivoted legs 9, which extend from base members 10 to table lugs 11 or other suitable means of attachment. By means of eccentrics 12 and rods 13, the table is given a longitudinally reciprocating motion upon rotation of the shaft 15 on which the eccentrics are mounted.

The pivoted legs 9 are preferably positioned at an angle to the vertical, as shown, so that the motion longitudinally imparted by the rods 13 is accompanied by an arcuate upward thrust of the table. This is sometimes designated a "grasshopper" motion.

The shaft 15 is journaled in suitable supports 14, and power for rotating the shaft is supplied from a motor (not shown) through a belt 2 to a shaft 40 having a cone pulley 16 mounted thereon. This pulley 16 is connected by a belt 17 to a cone pulley 18 on the shaft 15. Other suitable driving means may be substituted if desired. A belt shifting device may be used with the apparatus illustrated to control the frequency of reciprocation of the table, and such a device is conventionally illustrated at 41.

The deck of the table is advantageously a perforate sheet on which the granular material is separated. This perforate sheet may be a metallic fabric or a perforated plate or any similar strong porous material. It must be sufficiently open to permit passage of air, but the perforations must be small enough to prevent the passage of granules of the decolorizing material therethrough. An upward passage of air through the perforate deck is essential to the most efficient operation of this type of classifying table.

An air chest 20 is positioned immediately below the deck with the perforate sheet or deck forming the top wall of the chest. A blower 22 supplies air to the chest through a suitable duct 21, at a moderate pressure. The volume of air may be controlled by regulator 23 or the like in duct 21. It is also advantageous to provide the interior of the chest with slats or baffles, indicated at 42 and 43, to effect the desired distribution of the air to the deck surface.

It is advantageous to provide the deck surface with a number of riffles 8 extending lengthwise of the table, as the provision of such riffles reduces the table size required for the separation of a given quantity of material. These riffles preferably have a height of about one-fourth to one-half inch at the feed end of the table and gradually diminish in height toward the opposite end of the table. Advantageously, they terminate a few inches short of the end opposite from the point of feed. I sometimes find it desirable to increase the height of the individual riffles from the feed side of the table transversely toward the discharge side. For example, the maximum height of successive riffles proceeding from the feed side to the discharge side of the table may increase from one-quarter inch to three-eighths inch, or from one-eighth inch to one-half inch, depending upon the maximum size of the particles undergoing separation. These riffles are conveniently constructed with a right-angle cross-section, which provides a horizontal flange for fastening to the deck and a vertical flange or face which is the effective riffle.

The mass of granular material undergoing separation naturally tends to form a much thicker layer at the feed end of the table than at the opposite end. For this reason, it is desirable to pass a greater amount of air through the deck at the feed end than at the opposite or discharge end. This result may be accomplished by means of baffles of suitable shape and form which are conveniently fastened to the lower side of the deck, inside the air chest. These baffles may conveniently be tapered, with the widest portion at the discharge end of the table and the narrowest portion at the feed end so that more air is permitted to pass through there.

Another effect of the maximum blast of air through the material where it first comes onto the table, is that it carries out of the major mass of material the undesirably fine material which may be present because of attrition, spalling, decomposition, etc. This fine material, if left in the mass, tends to choke up the voids and lengthens the time required for percolation. If the material is subjected to a heavy blast of air when it is first fed onto the classifying table, the fine material is lifted out of the mass and can then be readily picked up and carried off through a collecting hood 28, a duct 29, and a blower 30, to a cyclone separator 31, and a container 32, or other suitable point of disposal. Fine clay or fuller's earth, for example, which is separated in this way and collected in the container 32, is suitable for use in the "contact" process of decolorization.

In the practice of my separating or classifying step, the table is set in motion and the air supply to the chest under the perforate deck is turned on. For best results, the exhaust fan or blower connected to the hood 28 is also started in operation. The dry granular fuller's earth or other decolorizing agent, which ordinarily has just previously been revivified, is fed to the table through the feed hopper 5. The combination of the reciprocating of "grasshopper" motion of the deck with the upward flow of the air through the deck, causes the particles to travel across the table from the point of their introduction. In the course of this travel, the individual particles take different courses, depending on their physical characteristics, and they are eventually discharged over different portions of the discharge edge 7.

The portions discharged over the various parts of the discharge edge have different decolorizing values. The material with highest decolorizing value tends to travel in a direction approximately perpendicular to the path of the table and discharges into the funnel 33, for example. The granules discharged from successive zones around the discharge edge of the table, starting with funnel 33, have successively diminishing decolorizing values. For example, it is not uncommon to obtain at the last zone (funnel 39 in the drawing) material which has traveled almost entirely longitudinally on the table, and which has substantially no decolorizing value.

As an example of the operation of this classifying procedure, I separated by the process and apparatus above-described, a quantity of used and re-burned fuller's earth from an oil refinery. Several identical samples of light petroleum lubricating oil were percolated through batches of separated clay from various discharge funnels, with the results shown below:

Color of oil before percolation through clay__ 74
Color of oil percolated through unseparated clay _____ 16
Color of oil percolated through separated clay from funnels 33, 34 and 35_____ 9
Color of oil percolated through separated clay from funnels 36 and 37_____ 36
Color of oil percolated through separated clay from funnels 38 and 39_____ 65

The conditions of each percolation or filtering test were, of course, maintained uniform, to secure comparability. All colors were determined on a Lovibond colorimeter, using a one inch oil cell and standard color glasses of the 500 amber series.

For another specific example, the colors of oil percolated through an unseparated clay and through various cuts therefrom were as follows:

Unfiltered oil_____ 74
Oil from unseparated clay_____ 33
Oil from clay from funnel 33_____ 14
Oil from clay from funnels 34 and 35_____ 27
Oil from clay from funnels 36, 37, 38 and 39__ 59

A large number of different fuller's earths were subjected to similar separation and similar determination of decolorizing value, and the results were invariably of the same nature. My process has likewise been practiced with bone char, and tests have been made with partly refined sugar solutions and other liquids. The tests have invariably shown that the dry granular decolorizing mediums subjected to my process show substantially varying decolorizing value according to the portion of the separating table from which they discharge.

By maintaining a strong exhaust draft above the deck 1 in the vicinity of the feed zone 5, through hood 28 and blower 30, I find it possible to remove undesirably fine material concurrently with my separation according to decolorizing value, and in this manner I attain the commercial desideratum of maximum decolorizing effect and maximum rate of filtration. Because of the high investment cost involved in filtering operations, the time required for commercial filtering, and the relatively high loss of liquid in clay soakage, there is a very great advantage in this process.

The most useful application of my classifying procedure appears to be in decolorizing processes of the kind described hereinabove, in which users of decolorizing agents are now able to separate out those particles of decolorizing agent which have depreciated in decolorizing ability until their further use is uneconomical, without losing any material which is of further value. Regardless of the point at which any particular user considers his decolorizing agent to be of no further value, my process permits close and continuous separation at that point.

I consider the most advantageous embodiment of my invention to be the continuous separation of the decolorizing mass at some predetermined degree of degradation, with the rejection of all of the inferior material separated and the continuous replacement of the rejected material by material having a decolorizing value which is equal to or better than the average of that retained from the separation. This general procedure has been employed in various industries, but the advantages of it are perhaps best illustrated in connection with the use of fuller's earth for decolorizing petroleum products. For example, in one refinery in which petroleum oils are treated, it was customary to discard all of the decolorizing clay after it had been used and re-burned 9 or 10 times. After the adoption of my process, this same refinery was able to separate out and reject a small percentage (around 5 per cent) of depreciated or degraded clay after each burning, replacing that rejected clay with new clay. They thereby maintained a mass of decolorizing agent of substantially uniform decolorizing value, and continually characterized by a decolorizing value better than that of similar clay which had been used only once or twice, without separation.

The above-described classifying procedure is described in more detail and claimed in my application Serial No. 753,197, filed November 15, 1934, of which this application is a continuation-in-part.

What I claim is:

1. The method of decolorizing liquids, which comprises contacting a liquid containing coloring matter with a mass of granular adsorbent decolorizing material which removes coloring matter from the liquid, revivifying the used decolorizing material by a treatment which includes heating it to a temperature sufficiently high to burn out adsorbed organic matter, whereby the decolorizing power or some granules of said decolorizing material is decreased, classifying the revivified granular decolorizing material into at least two portions including a portion characterized by higher decolorizing power than the unseparated material and a second portion characterized by lower decolorizing power than the unseparated material, withdrawing said portion of lower decolorizing power, adding to said portion of higher decolorizing power a sufficient further quantity of granular decolorizing material having at least equally high decolorizing power to make up the desired total mass of decolorizing material, and contacting the resulting mass of decolorizing material with a further quantity of said liquid to remove coloring matter therefrom.

2. The method of claim 1, wherein the liquid is a petroleum product.

3. The method of claim 1, wherein the granular decolorizing material is fuller's earth.

4. The method of treating oils, which comprises contacting an oil containing undesirable adsorbable matter with granular adsorbent fuller's earth which adsorbs said matter from the oil, revivifying the used granular adsorbent by a treatment which includes heating it to a temperature sufficiently elevated to burn out adsorbed organic matter, whereby the density of some granules of the fuller's earth is increased, classifying the revivified granular fuller's earth into at least two portions including a portion characterized by higher adsorbent power than the unseparated material and a second portion characterized by lower adsorbent power than the unseparated material, withdrawing said portion of lower adsorbent power, adding to said portion of higher adsorbent power a sufficient further quantity of granular adsorbent fuller's earth having at least equally high adsorbent power to make up the desired total mass of adsorbent, and contacting the resulting mass of fuller's earth with a further quantity of said oil to adsorb matter therefrom.

5. The method of claim 4, wherein the oil is a petroleum product.

6. The method of claim 4, wherein the adsorbed matter is coloring matter.

7. The method of claim 4, wherein the revivified granular fuller's earth is classified by charging it in a stream onto a supporting means comprising a plane so disposed that particles resting loosely thereon will be drawn in one direction by the force of gravity, and then subjecting the granular fuller's earth to a force tending to cause individual granules to travel on the plane in a direction other than that resulting from the force of gravity.

8. The method of claim 4, wherein the revivified granular fuller's earth is classified by charging it in a stream onto a perforate inclined plane and there subjecting it simultaneously to a force tending to cause individual granules to travel on the plane in a direction other than that resulting from the force of gravity and to a blast of air from below having sufficient strength to lift out of the material particles of undesired fineness.

EDWIN G. STEELE.